United States Patent
Kim

(10) Patent No.: US 11,876,570 B2
(45) Date of Patent: Jan. 16, 2024

(54) ELECTRONIC DEVICE AND METHOD FOR DETECTING EMERGENCY OF VEHICLE

(71) Applicant: THINKWARE CORPORATION, Seongnam-si (KR)

(72) Inventor: Daewon Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 246 days.

(21) Appl. No.: 17/517,771

(22) Filed: Nov. 3, 2021

(65) Prior Publication Data

US 2022/0140923 A1    May 5, 2022

(30) Foreign Application Priority Data

Nov. 3, 2020   (KR) .......................... 10-2020-0145595
Nov. 4, 2020   (KR) .......................... 10-2020-0145636
Nov. 2, 2021   (KR) .......................... 10-2021-0148736

(51) Int. Cl.
  *H04B 17/318*   (2015.01)
  *H04W 4/46*   (2018.01)
  (Continued)

(52) U.S. Cl.
  CPC ........... *H04B 17/318* (2015.01); *G07C 5/008* (2013.01); *H04B 17/373* (2015.01); *H04W 4/46* (2018.02)

(58) Field of Classification Search
  CPC ......... H04W 4/90; H04W 4/40; H04W 76/14; H04W 88/04; H04W 76/50; H04W 4/46; H04W 8/005; H04W 92/18; H04W 4/44; H04W 4/80; H04W 4/06; H04W 4/70; H04W 72/51; H04W 72/02; H04W 4/02; H04W 4/021; H04W 76/27; H04W 52/0216; H04W 4/12; H04W 72/20; H04L 67/12; H04L 5/0051; H04L 65/1016; H04L 65/1104; H04L 27/0006; H04L 5/0094; H04L 67/51; H04L 1/189; H04L 5/0048;
  (Continued)

(56) References Cited

U.S. PATENT DOCUMENTS

2012/0294163 A1* 11/2012 Turtinen ........... H04W 56/0045
                                                        370/252
2014/0094180 A1*  4/2014 Zhou .................... H04W 76/14
                                                        455/445

(Continued)

*Primary Examiner* — Golam Sorowar
(74) *Attorney, Agent, or Firm* — WHDA, LLP

(57) ABSTRACT

A first electronic device comprises a communication circuitry; a memory configured to store instructions; and a processor, coupled with the communication circuitry; wherein the processor is configured to: receive, from a second electronic device, a signal for indicating to transmit a test signal via a device-to-device (D2D) communication path between the first electronic device and a third electronic device to the third electronic device, the signal is transmitted from the second electronic device to the first electronic device; transmit the test signal via the D2D communication path to the third electronic device; activate a timer for monitoring whether a response signal regarding the test signal is received or not; transmit, to the second electronic device, a first message for indicating that a vehicle is not in an emergency situation; and transmit, to the second electronic device, a second message for indicating that the vehicle is in the emergency situation.

20 Claims, 5 Drawing Sheets

(51) Int. Cl.
*H04B 17/373* (2015.01)
*G07C 5/00* (2006.01)

(58) Field of Classification Search
CPC ......... H04L 67/565; H04L 69/18; H04L 1/00;
H04L 1/08; H04L 1/1678; H04L 1/1887;
H04L 12/184; H04L 2001/0093; H04L
2001/0097; H04L 27/2607; H04B
7/15507; H04B 17/318; H04B 1/3827;
H04B 7/0617; H04B 7/15528; H04B
7/18502; H04B 7/18504; H04B 7/026;
H04B 7/15542; H04B 7/15592
See application file for complete search history.

(56) References Cited

U.S. PATENT DOCUMENTS

2015/0257160 A1* 9/2015 Ishida ................... H04W 72/52
455/452.1
2015/0296443 A1* 10/2015 Lim ...................... H04L 5/0048
370/312
2017/0367087 A1* 12/2017 Seo ....................... H04W 72/51
2021/0297128 A1* 9/2021 Badic ................... H04W 72/20
2023/0089553 A1* 3/2023 Abtin ................... H04W 76/50

* cited by examiner

ELECTRONIC DEVICE AND METHOD FOR DETECTING EMERGENCY OF VEHICLE

CROSS-REFERENCE TO RELATED APPLICATION(S)

This application claims the benefit under 35 U.S.C. § 119(a) of Korean patent applications filed in the Korean Intellectual Property Office on Nov. 3, 2020, Nov. 4, 2020, and Nov. 2, 2021, respectively, and assigned Serial Nos. 10-2020-0145595, 10-2020-0145636, and 10-2021-0148736, the disclosure of which is incorporated by reference herein in its entirety.

BACKGROUND

Field

Various embodiments described below relate to an electronic device and method for detecting emergency.

Description of Related Art

With the development of information and communication technology (ICT), electronic devices embedded in vehicles or detachably attached to the vehicles have been developed. The electronic device may communicate with at least one other electronic device by including at least one communication circuit. The at least one other electronic device for executing communication with the electronic device may be a base station, or may be a server, and may be a user equipment such as the electronic device.

SUMMARY

An electronic device embedded in a vehicle or detachably attached to the vehicle may lose communication capabilities with other electronic devices due to an accident of the vehicle. The loss of the communication capability may limit the electronic device to send the emergency call to another electronic device associated with the emergency agent. Therefore, even if the communication capability of the electronic device is lost, a method for detecting an accident of the vehicle that is embedded or detachably attached to the electronic device and to notifying other electronic devices associated with an emergency agent.

The technical problems to be achieved in this document are not limited to those described above, and other technical problems not mentioned herein will be clearly understood by those having ordinary knowledge in the art to which the present disclosure belongs from the following description.

A first electronic device according to various embodiments may comprise a communication circuitry; a memory configured to store instructions; and a processor, operably coupled with the communication circuitry; wherein the processor may be, when executing the instructions, configured to: receive, from a second electronic device operating as a relay node, a signal for indicating to transmit a test signal via a device-to-device (D2D) communication path between the first electronic device and a third electronic device to the third electronic device, the signal is transmitted from the second electronic device to the first electronic device in response to the second electronic device detecting that a communication path between the second electronic device and the third electronic device is disconnected; in response to the reception of the signal, transmit the test signal via the D2D communication path to the third electronic device; in response to the reception of the signal, activate a timer for monitoring whether a response signal regarding the test signal is received or not based on identifying that the response signal is received from the third electronic device before the activated timer is expired, transmit, to the second electronic device, a first message for indicating that a vehicle comprising the third electronic device is not in an emergency situation; and based on identifying that the response signal is not received from the third electronic device until the activated timer is expired, transmit, to the second electronic device, a second message for indicating that the vehicle comprising the third electronic device is in the emergency situation.

According to various embodiments, a method for operating a first electronic device comprising a communication circuitry, the method may comprise: receiving, from a second electronic device operating as a relay node, a signal for indicating to transmit a test signal via a device-to-device (D2D) communication path between the first electronic device and a third electronic device to the third electronic device, the signal is transmitted from the second electronic device to the first electronic device in response to the second electronic device detecting that a communication path between the second electronic device and the third electronic device is disconnected; in response to the reception of the signal, transmit the test signal via the D2D communication path to the third electronic device; in response to the reception of the signal, activate a timer for monitoring whether a response signal regarding the test signal is received or not; based on identifying that the response signal is received from the third electronic device before the activated timer is expired, transmit, to the second electronic device, a first message for indicating that a vehicle comprising the third electronic device is not in an emergency situation; and based on identifying that the response signal is not received from the third electronic device until the activated timer is expired transmit, to the second electronic device, a second message for indicating that the vehicle comprising the third electronic device is in the emergency situation.

According to various embodiments, a computer readable storage medium may store one or more programs, the one or more programs comprising instructions which when executed by at least one processor of a first electronic device, cause the first electronic device to: receive, from a second electronic device operating as a relay node, a signal for indicating to transmit a test signal via a device-to-device (D2D) communication path between the first electronic device and a third electronic device to the third electronic device, the signal is transmitted from the second electronic device to the first electronic device in response to the second electronic device detecting that a communication path between the second electronic device and the third electronic device is disconnected; in response to the reception of the signal, transmit the test signal via the D2D communication path to the third electronic device; in response to the reception of the signal, activate a timer for monitoring whether a response signal regarding the test signal is received or not; based on identifying that the response signal is received from the third electronic device before the activated timer is expired, transmit, to the second electronic device, a first message for indicating that a vehicle comprising the third electronic device is not in an emergency situation; and based on identifying that the response signal is not received from the third electronic device until the activated timer is expired, transmit, to the second electronic device, a second message for indicating that the vehicle comprising the third electronic device is in the emergency situation.

The electronic device and method according to various embodiments can provide enhanced public safety by detecting whether the other electronic device is in an emergency state using a device-to-device (D2D) communication capability of the electronic device located adjacent to another electronic device having lost communication capability.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The terms used in the present disclosure are used only to describe specific embodiments and may not be intended to limit the scope of other embodiments. The singular expression may include the plural expression unless the context clearly dictates otherwise. Terms used herein, including technical or scientific terms, may have the same meaning as those generally understood by those with ordinary knowledge in the technical field described in this disclosure. Among the terms used in this disclosure, terms defined in general dictionary may be interpreted in the same or similar meaning as the context of the relevant technology and may not be interpreted in an ideal or excessively formal meaning unless clearly defined in this disclosure. In some cases, even terms defined in the present disclosure cannot be interpreted to exclude embodiments of the present disclosure.

In various embodiments of the present disclosure described below, a hardware approach method will be described as an example. However, since various embodiments of the present disclosure include technologies that use both hardware and software, various embodiments of the present disclosure do not exclude software-based approaches.

Figure 1:
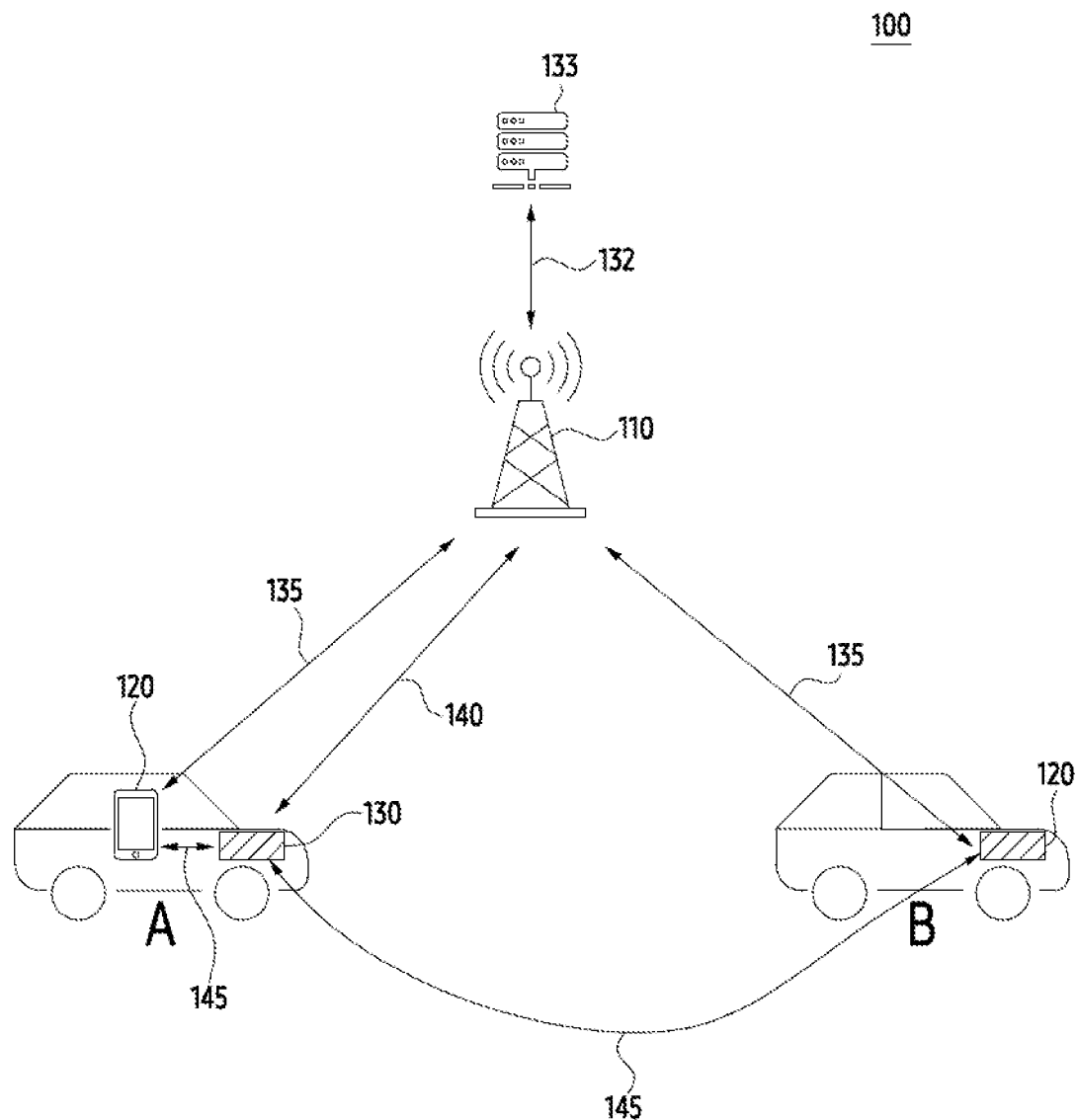
FIG. 1 illustrates an environment according to various embodiments.

FIG. 1 illustrates an environment according to various embodiments.

Referring to FIG. 1, the environment 100 may include a first electronic device 110, a second electronic device 120, a third electronic device 130, and a fourth electronic device 133.

In various embodiments, the first electronic device 110 may execute communication with the second electronic device 120. For example, the first electronic device 110 may execute communication with the second electronic device 120 to transfer the signal received from the second electronic device 120 to another electronic device (not shown in FIG. 1). As another example, the first electronic device 110 may execute communication with the second electronic device 120 to transmit a signal received from the other electronic device to the second electronic device 120. In various embodiments the first electronic device 110 may execute communication with the third electronic device 130. For example, the first electronic device 110 may execute communication with the third electronic device 130 to transmit a signal received from the third electronic device 130 to another electronic device. As another example, the first electronic device 110 may execute communication with the third electronic device 130 to transmit a signal received from the other electronic device to the third electronic device 130.

In various embodiments, the first electronic device 110 may be an electronic device to which a plurality of electronic devices including the second electronic device 120 and the third electronic device 130 are connected. For example, each of the plurality of electronic devices located in at least one cell provided by the first electronic device 110 may access the first electronic device 110 and execute communication with the other electronic device based on the connection with the first electronic device 110. In other words, the first electronic device 110 may be referred to as a relay node. For example, the first electronic device 110 may be a base station, an access point (AP), or the like.

In various embodiments, the second electronic device 120 may be an electronic device included in a moving vehicle. For example, the second electronic device 120 may be a mobile terminal of a user in a vehicle A being moved. As another example, the second electronic device 120 may be a communication device embedded in a moving vehicle B. However, it is not limited thereto.

In various embodiments, the second electronic device 120 may execute communication with the first electronic device 110, which is an upper node of the second electronic device 120. In various embodiments, the second electronic device 120 may execute communication with the third electronic device 130 having the same level as the level of the second electronic device 120. For example, communication between the second electronic device 120 and the third electronic device 130 may be referred to as device-to-device (D2D) communication in terms of communication between electronic devices having the same level. For example, the D2D communication may mean communication for exchanging signals through a direct communication path between the second electronic device 120 and the third electronic device 130 without passing through a relay node such as the first electronic device 110. However, it is not limited thereto.

In various embodiments, the third electronic device 130 may be an electronic device included in a moving vehicle. For example, the third electronic device 130 may be a communication device embedded in the moving vehicle A.

In various embodiments, the third electronic device 130 may execute communication with the first electronic device 110, which is an upper node of the third electronic device 130. In various embodiments, the third electronic device 130 may execute communication with the second electronic device 120 having the same level as the level of the third electronic device 130. For example, communication between the third electronic device 130 and the second electronic device 120 may be referred to as device-to-device (D2D) communication in terms of communication between electronic devices having the same level. However, it is not limited thereto.

In various embodiments, the fourth electronic device 133 may be an electronic device that provides a vehicle emergency service to the second electronic device 120 through the first electronic device 110. For example, the fourth electronic device 133 may provide the vehicle emergency service to the second electronic device 120 by receiving the signal from the second electronic device 120 through the first electronic device 110 and transmitting a message to another electronic device (not shown in FIG. 1) related to the emergency agent to notify that the vehicle A is within the emergency state based on identifying that the vehicle A being moved is within the emergency state based on the received signal. As another example, the fourth electronic device 133 may provide the vehicle emergency service to the third electronic device 130 by receiving the signal from the third electronic device 130 through the first electronic device 110 and transmitting a message to the other electronic device related to the emergency agent to notify that the vehicle B is within the emergency state based on identifying that the vehicle B being moved is within the emergency state based on the received signal. However, it is not limited thereto. For example, the emergency state may mean a state (e.g., a traffic accident) in which an external impact acts on a vehicle (e.g., vehicle A). For example, the emergency state may refer to a state in which the vehicle (e.g., vehicle A) malfunctions without the external impact. However, it is not limited thereto Various embodiments described below may identify whether the disconnection of the communication path 140 between the first electronic device 110 and the third electronic device 130 is caused by an accident of the vehicle A by using a communication path 135 between the first electronic device 110 and the second electronic device 120, the communication path 145 between the second electronic device 120 and the third electronic device 130 and the communication path 132 between the first electronic device 110 and the fourth electronic device 133, when the communication path 140 between the first electronic device 110 and the third electronic device 130 is disconnected; and may provide the vehicle emergency service for the vehicle A based on identifying that the disconnection of the communication path 140 between the first electronic device 110 and the third electronic device 130 is due to the emergency state of the vehicle A.

Figure 2:
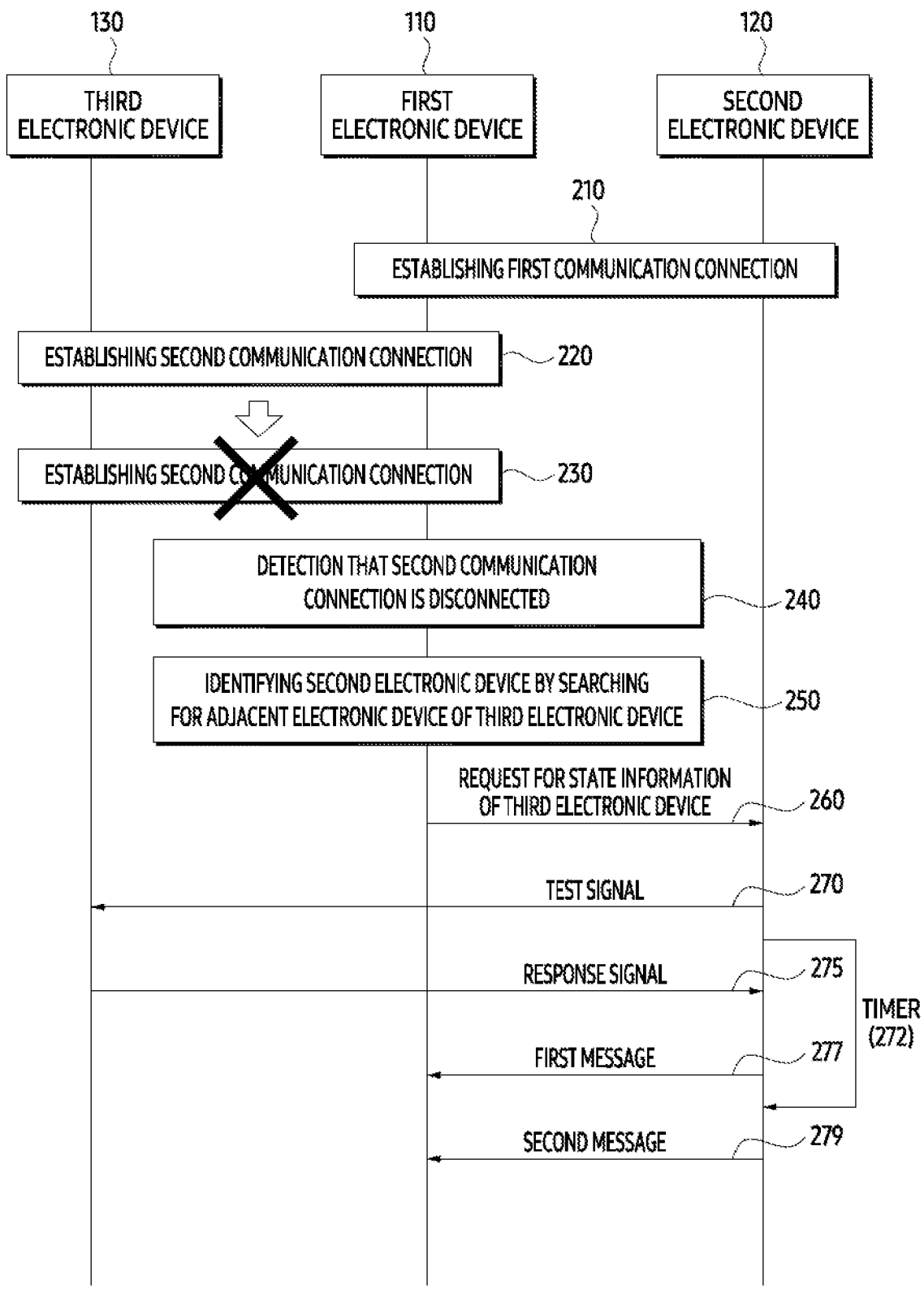
FIG. 2 illustrates an example of signaling according to various embodiments.

FIG. 2 illustrates an example of signaling according to various embodiments. Such signaling may be executed by the first electronic device 110, the second electronic device 120, and the third electronic device 130 shown in FIG. 1.

Referring to FIG. 2, in operation 210, the first electronic device 110 may establish a first communication connection between the first electronic device 110 and the second electronic device 120. For example, the first electronic device 110 may broadcast information on at least one cell provided by the first electronic device 110 and establish the first communication connection through control signaling with the second electronic device 120 connected to the first electronic device 110 based on the information on the at least one cell.

In operation 220, the first electronic device 110 may establish a second communication connection between the first electronic device 110 and the third electronic device 130. For example, the first electronic device 110 may broadcast information on at least one cell provided by the first electronic device 110 and may establish the second communication connection through control signaling with the third electronic device 130 connected to the first electronic device 110 based on the information on the at least one cell. The second communication connection may be used for communication between the first electronic device 110 and the third electronic device 130.

FIG. 2 illustrates an example in which operation 220 is executed after operation 210 is executed, but this is for convenience of explanation. Operation 210 and operation 220 may be executed simultaneously, or operation 210 may be executed after operation 220 is executed. In other words, operations 210 and 220 may be executed regardless of order or may be executed in parallel.

In operation 230, the second communication connection between the first electronic device 110 and the third electronic device 130 may be disconnected. For example, when the vehicle A is in an emergency state, the third electronic device 130 may lose communication capability with the first electronic device 110. Due to the loss of the communication capability, the second communication connection between the first electronic device 110 and the third electronic device 130 may be disconnected.

In operation 240, the first electronic device 110 may detect that the second communication connection is disconnected. For example, the first electronic device 110 may detect that the second communication connection is disconnected by identifying that at least one signal to be periodically received from the third electronic device 130 is not received for designated time. However, it is not limited thereto. For example, the first electronic device 110 may identify the state of the second communication connection based at least in part on control information or user data received from the third electronic device 130 while the second communication connection is maintained. The first electronic device 110 may detect that the second communication connection is disconnected based on identifying that control information or user data is not received from the third electronic device 130 even though the state of the second communication connection is capable of providing communication equal to or higher than a designated quality. As another example, the first electronic device 110 may transmit a request signal to the third electronic device 130. The first electronic device 110 may detect that the second communication connection is disconnected based on identifying that the response signal for the request signal is not received for a specified time. As another example, the first electronic device 110 may obtain information on the location of the third electronic device 130 and identify that the third electronic device 130 is located within at least one cell provided by the first electronic device 110 based on the location of the third electronic device 130. For example, the information on the location may be obtained from a value of a timing advance (TA) for the first electronic device 110, or may be obtained by explicitly receiving information on the location from the third electronic device 130 while the second communication connection is maintained. For example, the information on the location may be obtained from another electronic device (e.g., a server for providing a navigation service) connected to the third electronic device 130. However, it is not limited thereto. The first electronic device 110 may detect that the second communication connection is disconnected under a condition that the signal from the third electronic device 130 is not received for a designated time even though the third electronic device 130 is located within the at least one cell. However, it is not limited thereto.

In operation 250, the first electronic device 110 may identify for the second electronic device 120 by searching for at least one electronic device adjacent to the third electronic device 130 based on the detection or in response to the detection. For example, the first electronic device 110 may obtain information on location of each of the plurality of electronic devices from each of a plurality of electronic devices in at least one cell provided by the first electronic device 110. The first electronic device 110 may search for the second electronic device 120 by searching for at least one electronic device adjacent to the third electronic device 130 based on the information. In an embodiment, the first electronic device 110 may search for the second electronic device 120 further based on the strength of reception of the information. As another example, the first electronic device 110 may identify the second electronic device 120 by searching for an electronic device having identification information corresponding to identification information (or account information) of the third electronic device 130. For example, when the third electronic device 130 is an embedded device in the moving vehicle A and the second electronic device 120 is a portable device of the moving vehicle A, the identification information of the second electronic device 120 may correspond to the identification information of the third electronic device 130. The first electronic device 110 may identify the second electronic device 120 by searching for an electronic device having identification information corresponding to the identification information of the third electronic device 130. As another example, the first electronic device 110 may transmit a request to transmit a response to all electronic devices in the at least one cell provided or served by the first electronic device 110 and the electronic device connected or connectable through the D2D communication path with the third electronic device 130 may transmit a request to transmit a response to the first electronic device 110. The first electronic device 110 may identify the second electronic device 120 based on receiving the response from the second electronic device 120. However, it is not limited thereto.

In operation 260, the first electronic device 110 may request state information of the third electronic device 130 from the second electronic device 120 searched through operation 250. For example, the first electronic device 110 may inquire to the second electronic device 120 in what state the third electronic device 130 is in through the first communication connection. In an embodiment, the priority of requesting the state information may be higher than the priority of other signals transmitted from the first electronic device 110 to the second electronic device 120. For example, in response to searching for the second electronic device 120 in operation 250, the first electronic device 110 may defer transmission of the other signals to be transmitted to the second electronic device 120 and transmit a request for the state information. However, it is not limited thereto. The second electronic device 120 may receive the request from the first electronic device 110.

In operation 270, the second electronic device 120 may transmit a test signal to the third electronic device 130 through a communication path (e.g., the communication path 145 of FIG. 1) between the second electronic device 120 and the third electronic device 130. According to embodiments, the test signal may be repeatedly transmitted from the second electronic device 120 to the third electronic device 130 to provide high reception performance. According to embodiments, the transmission strength of the test signal repeatedly transmitted from the second electronic device 120 to the third electronic device 130 may have diversity to provide high reception performance. For example, at the first transmission, the test signal may be transmitted to X (dB) and at the second transmission, the test signal may be transmitted to Y (dB) (Y is a value greater than X). However, it is not limited thereto. According to embodiments, the frequency of the test signal repeatedly transmitted from the second electronic device 120 to the third electronic device 130 may have diversity. For example, at the first transmission, the test signal is transmitted on a first frequency in a transmission band of the communication path between the second electronic device 120 and the third electronic device 130; at the second transmission, the test signal may be transmitted on a second frequency in the transmission band different from the first frequency. However, it is not limited thereto.

In various embodiments, the test signal may be a signal that specifies and is transmitted to the third electronic device 130. For example the test signal may be unicast. For example, if the identification information of the second electronic device 120 corresponds to the identification information of the third electronic device 130 or if the second electronic device 120 and the third electronic device are the same user's electronic devices, the second electronic device 120 may specify the second electronic device 120, the third electronic device 130 and may transmit the test signal because the second electronic device 120 recognizes information on the third electronic device 130. As another example, in operation 260, the second electronic device 120 may obtain information of the third electronic device 130 from the request received from the first electronic device 110. The second electronic device 120 may specify the third electronic device 130 based on the information of the third electronic device 130 obtained in operation 260 and transmit the test signal. However, it is not limited thereto.

In operation 272, in response to completing the transmission of the test signal, the second electronic device 120 may activate a timer for detecting whether the vehicle related to the third electronic device 130 is in an emergency situation.

For example, it is assumed that the distance between the first electronic device 110 and the third electronic device 130 is longer than the distance between the second electronic device 120 and the third electronic device 130. Due to the difference between the distance between the first electronic device 110 and the third electronic device 130 and the distance between the second electronic device 120 and the third electronic device 130, the communication connection between the second electronic device 120 and the third electronic device 130 may be more robust than the second communication connection between the first electronic device 110 and the third electronic device 130.

Considering the robustness of the communication connection between the second electronic device 120 and the third electronic device 130, when the second communication connection between the first electronic device 110 and the third electronic device 130 is disconnected and the communication connection between the second electronic device 120 and the third electronic device 130 is activated, it may mean that the vehicle A in which the third electronic device 130 is embedded is not in an emergency state and that only the communication connection between the first electronic device 110 and the third electronic device 130 is at least temporarily disconnected; and when the second communication connection between the first electronic device 110 and the third electronic device 130 is disconnected and the communication connection between the second electronic device 120 and the third electronic device 130 is disconnected, it may mean that the vehicle A embedding the third electronic device 130 is in an emergency state.

In various embodiments, the second electronic device 120 may activate the timer to identify whether the third electronic device 130 transmits a response signal for the test signal to the second electronic device 120. In an embodiment, the timing of activating the timer may be changed according to whether the test signal is repeatedly transmitted. For example, under conditions in which the test signal is repeatedly transmitted, the timer may be activated in response to last transmitting the test signal. However, it is not limited thereto.

In various embodiments, the second electronic device 120 may identify whether the response signal for the test signal is received from the third electronic device 130 until the timer expires.

In operation 275, the third electronic device 130 may transmit a response signal before the timer of the second electronic device 120 expires. The second electronic device 120 may receive the response signal from the third electronic device 130.

In operation 277, the second electronic device 120 may transmit a first message to the first electronic device 110 in response to reception of the response signal. In various embodiments, the first message may be used to indicate that the vehicle A embedding the third electronic device 130 is not in an emergency state.

FIG. 2 illustrates an example in which the second electronic device 120 transmits the first message before the timer expires, but this is for convenience of explanation. According to embodiments, the second electronic device 120 may transmit the first message to the first electronic device 110 after the timer expires.

In operation 279, the second electronic device 120 may identify that the response signal is not received from the third electronic device 130 until the timer expires. The second electronic device 120 may transmit a second message to the first electronic device 110 based on (or in response) identifying that the response signal is not received from the third electronic device 130 until the timer expires. The second message may be used to indicate that the vehicle A embedding the third electronic device 130 is in an emergency state.

Meanwhile, the first electronic device 110 may receive the second message from the second electronic device 120. Although not shown in FIG. 2, the first electronic device 110 may transmit a message to the fourth electronic device 133 to indicate that an accident occurs to the vehicle A in order to provide the vehicle A with an emergency service, based reception of the second message. For example, the message transmitted from the first electronic device 110 to the fourth electronic device 133 may include location information of the third electronic device 130 obtained by the first electronic device 110 before the second communication connection between the first electronic device 110 and the third electronic device 130 is disconnected. According to embodiments, the location information may be used by the fourth electronic device 133 for the vehicle emergency service or may be shared with another electronic device related to the fourth electronic device 133 for the vehicle emergency service.

As described above, when the second communication connection between the first electronic device 110 and the third electronic device 130 is disconnected, the first electronic device 110 according to various embodiments may detect whether the vehicle A including the third electronic device 130 is in an emergency state by requesting to transmit a test signal to the second electronic device 120 capable of executing D2D communication with the third electronic device 130. The first electronic device 110 according to various embodiments may provide an automobile emergency service for the vehicle A by transmitting a message to the fourth electronic device 133 based on detecting that the vehicle A is in the emergency state. Meanwhile, the second electronic device 120 according to various embodiments may transmit a test signal to the third electronic device 130 through D2D communication at the request of the first electronic device 110 and may determine whether the vehicle A is in an emergency state according to whether the response signal for the test signal is received. The second electronic device 120 according to various embodiments may assist the vehicle emergency service for the vehicle A through this determination.

Meanwhile, in operation 270 of FIG. 2 according to various embodiments, the second electronic device 120 may transmit a vehicle state confirmation request message for requesting information on the state of the vehicle in which the third electronic device 130 is installed or the state of the vehicle in which the third electronic device 130 is embedded to the third electronic device 130. Upon receiving the vehicle state confirmation request message, the third electronic device 130 may obtain state information of the vehicle from the vehicle electronic control device connected to the in-vehicle network. In operation 275 of FIG. 2, the third electronic device 130 may transmit the obtained state information of the vehicle to the second electronic device 120. The meaning of "installed" may include a state in which the third electronic device 130 is mounted on a dashboard of the vehicle or mounted in the vehicle through a separate cradle by a user such as a driver of the vehicle or a dealer of the vehicle in an aftermarket after the vehicle is released. However, it is not limited thereto. The meaning of "embedded" includes being built-in as a component in the vehicle by the vehicle manufacturer before the vehicle is released in a before market. However, it is not limited thereto.

In an embodiment, the in-vehicle network is a network capable of providing communication interface with a vehicle electronic control device and may include various protocols such as Car Area Network (CAN), Ethernet, AUTOSAR, and FlexRay. In this case, the vehicle electronic control device may include a device that generates various control information necessary driving a vehicle, such as an electronic control unit (ECU).

Meanwhile, the third electronic device 130 receiving the vehicle state confirmation request message according to another embodiment may transmit the vehicle state confirmation message to the second electronic device 120 in response to the vehicle state confirmation request message. The vehicle state confirmation message may include various information indicating the current state of the vehicle. For example, the vehicle state confirmation message may include a vehicle brake state, a vehicle sensor state, a vehicle engine state, a vehicle communication state, an electric motor state of the vehicle, a fuel gauge of the vehicle, a battery voltage state of the vehicle, a steering state of the vehicle, a wiper operation state of the vehicle, a vehicle head lamp state of the vehicle, etc. In an embodiment, the second electronic device 120 may transmit the received vehicle state confirmation message to the first electronic device 110. The first electronic device 110 may indirectly check the state of the third electronic device 130 based on the vehicle state confirmation message.

Figure 3:
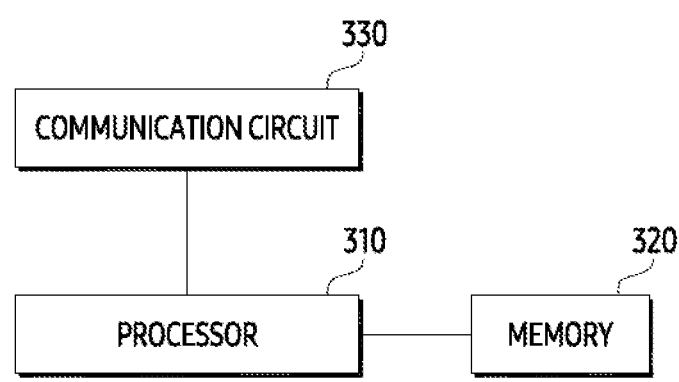
FIG. 3 is a simplified block diagram of an electronic device according to various embodiments.

FIG. 3 is a simplified block diagram of an electronic device according to various embodiments. The simplified block diagram may represent functional components of the first electronic device 110, the second electronic device 120, the third electronic device 130, and the fourth electronic device 140 in the environment 100 shown in FIG. 1.

Referring to FIG. 3, the electronic device 300 may include a processor 310, a memory 320, and a communication circuit 330.

The processor 310 may control the overall operation of the electronic device 300. In various embodiments, the processor 310 may include a single processor core or a plurality of processor cores. For example, the processor 310 may include a multi-core such as a dual-core, a quad-core, and a hexa-core. According to embodiments, the processor 310 may further include a cache memory located inside or outside.

The processor 310 may receive commands of other components of the electronic device 300, may interpret the received commands, and may perform calculations or process data according to the interpreted commands.

The processor 310 may process data or signals created or generated in a program. For example, the processor 310 may request an instruction, command, data, or signal from the memory 320 to execute or control a program. The processor 310 may record (or store) or update instruction, command, data, or signal to the memory 320 in order to execute or control the program.

The processor 310 may interpret and process messages, instructions, data, commands, or signals received from the memory 320 or the communication circuit 330. The processor 310 may generate a new message, data, commands, or signals based on the received message, data, commands, or signals. The processor 310 may provide a processed or generated message, data, command, or signal to the memory 320 or the communication circuit 330.

All or part of the processor 310 may be electrically or operatively coupled or connected to other components in the electronic device 300 (for example, the memory 320 or the communication circuit 330).

According to embodiments, the processor 310 may be configured with one or more processors. For example, the processor 310 may include at least one of an application processor, a communication processor, a graphical processing unit (GPU), or a sensor hub. In various embodiments, processor 310 may be configured to execute the operations illustrated through FIGS. 1 to 2.

The memory 320 may store instructions, commands, control command codes, control data, or user data for controlling the electronic device 300. For example, the memory 320 may include at least one of an application program, an operating system (OS), middleware, or a device driver.

The memory 320 may include at least one of a volatile memory and a non-volatile memory. The volatile memory may include dynamic random access memory (DRAM), static RAM (SRAM), synchronous DRAM (SDRAM), phase-change RAM (PRAM), magnetic FAM (MRAM), resistive RAM (RRAM), ferroelectric RAM (FeRAM), etc. The nonvolatile memory may include a read only memory (ROM), a programmable ROM (PROM), an electrically programmable ROM (EPROM), an electrically erasable programmable ROM (EEPROM), a flash memory, etc.

The memory 320 may further include a non-volatile medium such as a hard disk drive (HDD), a solid state disk (SSD), an embedded multi-media card (eMMC), and a universal flash storage (UFS).

The communication circuit 330 may support establishment of a wired or wireless communication channel between the electronic device 300 and the external electronic device and performance of communication through the established communication channel. According to one embodiment, the communication circuit 330 may include a wireless communication circuit (e.g., cellular communication circuitry, near field communication circuitry, or global navigation satellite system (GNSS) communication circuitry) or a wired communication circuit (e.g., local area network (LAN) communication circuit, or power line communication circuit), and may communicate with an external electronic device through a first network (e.g. near field communication (NFC), wireless power transfer (WPT), magnetic secure transmission (MST), Bluetooth, Wi-Fi direct, or short-range communication networks such as infrared data association (IrDA)) or a second network (e.g., long-distance communication networks such as cellular networks, the Internet, or computer networks (e.g., LAN or WAN)) using a corresponding communication circuit among them. The above-described various types of communication circuits 330 may be implemented as a single chip or as separate chips.

In various embodiments, the communication circuit 330 may be operatively coupled to the processor 310.

Figure 4:
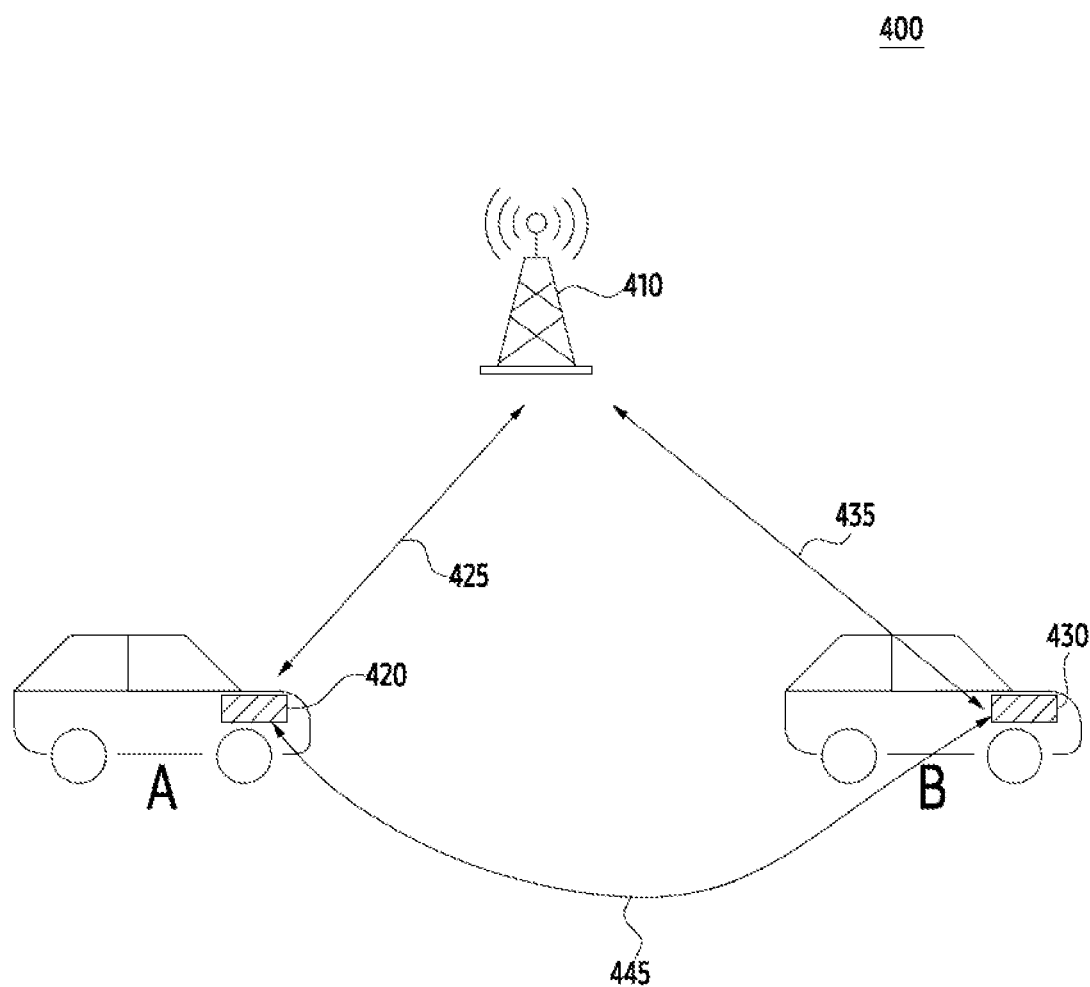
FIG. 4 illustrates a system environment according to an embodiment.

FIG. 4 illustrates a system environment according to an embodiment.

Referring to FIG. 4, a system environment 400 according to an embodiment may include a first electronic device 410, a second electronic device 420, and a third electronic device 430.

Each of the first electronic device 410, the second electronic device 420, and the third electronic device 430 may include functional components illustrated in FIG. 3.

The first electronic device 410 may open a first communication channel 425 with the second electronic device 420. In addition, the first electronic device 410 may open a second communication channel 435 with the third electronic device 430. The second electronic device 420 may open a third communication channel 445 with the third electronic device 430.

The first electronic device 410 may be a base station that serves as a relay between a plurality of electronic devices and an exchange station. The first electronic device 410 may perform functions such as opening a call channel with an electronic device (e.g., the second electronic device 420 and the third electronic device 430) provided in a moving object within a cell range that is a serviceable area assigned to the first electronic device 410 and transmitting a call signal. The cell range may be a communication available area of the first electronic device 410. The first electronic device 410 may communicate with a plurality of electronic devices (e.g., the second electronic device 420 and the third electronic device 430) located within the cell range, and may receive signals from the plurality of electronic devices. The first electronic device 410 may generate a list including information on a plurality of electronic devices located within the cell range based on signals received from a plurality of electronic devices within the cell range. The first electronic device 410 may transmit a list including a plurality of electronic device information to a plurality of electronic devices located within a cell range.

The second electronic device 420 and the third electronic device 430 may be electronic devices existing within a cell range supported by the first electronic device 410. The second electronic device 420 and the third electronic device 430 may be electronic devices provided on a moving object such as a vehicle. The second electronic device 420 and the third electronic device 430 may exchange signals and information through a third communication channel 145 (e.g., a device-to-device (D2D) communication channel) opened with each other. Each of the second electronic device 420 and the third electronic device 430 may directly communicate with the first electronic device 410.

In various embodiments, the second electronic device 420 and the third electronic device 430 may communicate with the first electronic device 410, which is an upper node of the second electronic device 420 and the third electronic device 430. In various embodiments, the second electronic device 420 may perform communication with the third electronic device 430 having the same level as the level of the second electronic device 420. For example, communication between the second electronic device 420 and the third electronic device 430 may be referred to as device-to-device (D2D) communication in terms of communication between electronic devices having the same level. However, it is not limited thereto. In various embodiments, the third electronic device 430 may perform communication with the second electronic device 420 having the same level as the level of the third electronic device 430. For example, communication between the third electronic device 430 and the second electronic device 420 may be referred to as device-to-device (D2D) communication in terms of communication between electronic devices having the same level. However, it is not limited thereto.

The second electronic device 420 and the third electronic device 430 may be connected to a control device in a moving object that processes information on a vehicle. A control device (e.g., an electronic control unit (ECU) in the moving object may control, drive, brake, and/or steering systems of the transmission. A control device (e.g., an electronic control unit (ECU) in the moving object may transmission control, driving, control a braking and/or steering system. The control device in the moving object may collect data of the driving, braking, shifting, and steering systems of the vehicle and determine the state of the vehicle and control each system to operate normally based on the collected data. For example, in order to control the driving system, the control device in the moving object may adjust the opening and closing of the injector by checking the designated ignition time MAP (Manifold Absolute Pressure) value and fuel injection MAP value according to the engine's rotational speed, air intake, air intake pressure and degree of opening of the accelerator and correcting the sensor and the like.

According to various embodiments, an emergency situation (e.g., a vehicle failure, a traffic accident, etc.) occurs in a moving object on which the second electronic device 420 is mounted, the second electronic device 420 may stop transmitting signals to the first electronic device 410. The second electronic device 420 may transmit a signal related to an emergency situation to the third electronic device 430 in the emergency situation. After receiving the signal related to the occurrence of an emergency, the third electronic device 430 may transmit a signal related to the occurrence of an emergency situation to the moving object on which the second electronic device 420 is mounted to the first electronic device 410.

Figure 5:
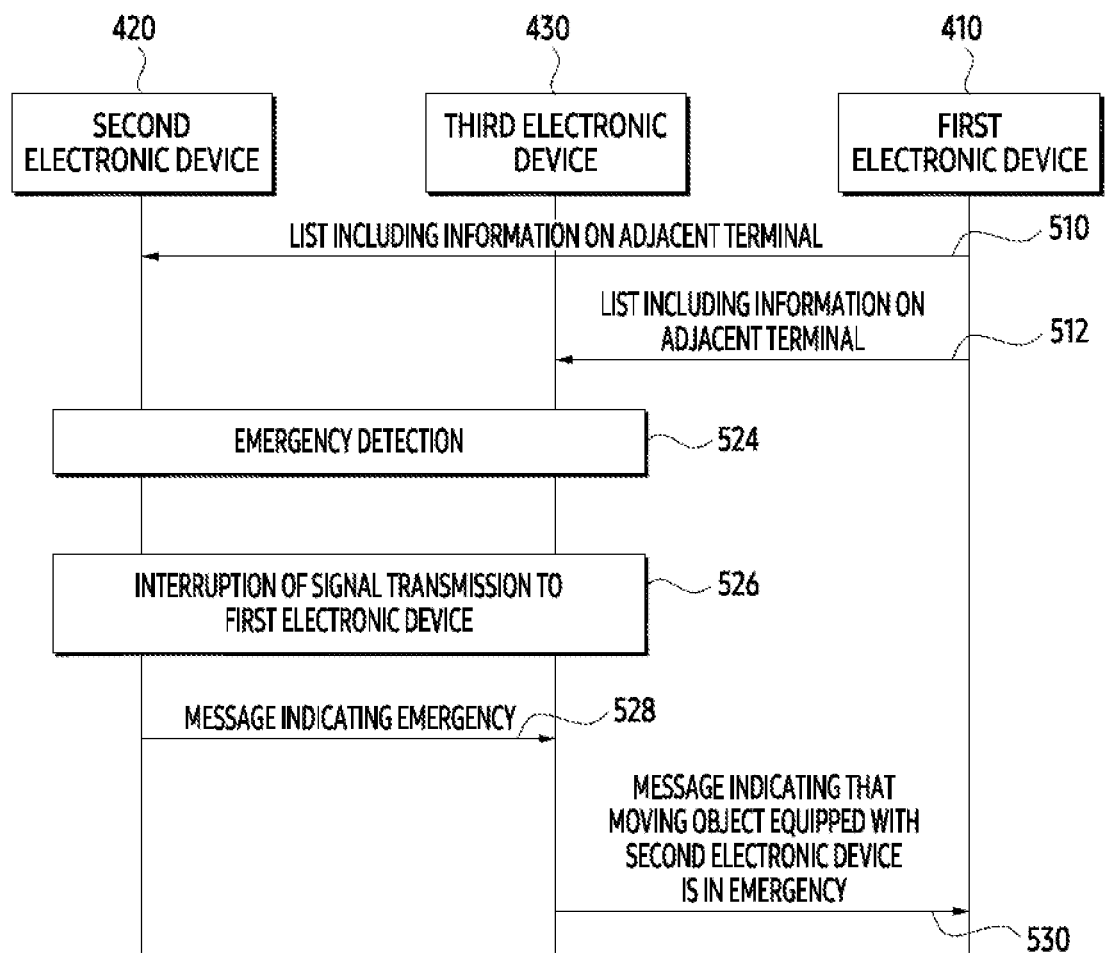
FIG. 5 is a flowchart illustrating an emergency situation notification operation according to an embodiment.

FIG. 5 is a flowchart illustrating an emergency situation notification operation according to an embodiment.

Referring to FIG. 5, the first electronic device 410, the second electronic device 420, and the third electronic device 430 may communicate with each other.

According to an embodiment, the first electronic device 410 may generate a list including information on adjacent terminals. The first electronic device 410 may receive information on terminals located within the serviceable cell range of the first electronic device 410 and generate a list of terminals located within the cell range based on the received information.

According to various embodiments, the first electronic device 410 may recombine a list including information related to an electronic device located within a certain range from an electronic device mounted on or embedded in moving object based on information on terminals located within a cell range. For example, the information may recombine the list including location information and movement direction information of the electronic device located within a certain range (or a designated range) from the electronic device mounted or embedded in the moving object. For example, the list may be obtained based on the location information and the movement direction information. The first electronic device 410 may transmit a list including information related to the electronic device located within a certain range from the recombinant electronic device to the electronic device. For example, the list may be broadcast within the cell range of the first electronic device 410. As another example, the list may be transmitted by specifying the second electronic device 420 and the third electronic device 430. However, it is not limited thereto.

For example, in operation 510, the first electronic device 410 may transmit, to the second electronic device 420, a list including information related to an electronic device located within a certain range of the second electronic device 420. When the third electronic device 430 is located within a designated range from the second electronic device 420, the first electronic device 410 may transmit a list including information on adjacent terminals including the third electronic device 430 to the second electronic device 420.

According to various embodiments, in operation 512, the first electronic device 410 may transmit a list including information related to an electronic device located within a predetermined range of the third electronic device 430 to the third electronic device 430. For example, the list may include location information of the second electronic device 420 and movement direction information of the second electronic device 420. When the second electronic device 420 is located within a predetermined range from the third electronic device 430, the first electronic device 410 may transmit a list including information on adjacent terminals including the second electronic device 420 to the third electronic device 430.

According to various embodiments, in operation 524, the second electronic device 420 may detect an emergency situation of a moving object mounted with the second electronic device 420 after receiving the list 410. For example, the second electronic device 420 may be connected to a control device of a moving object. The second electronic device 420 may detect that an emergency situation of the moving object occurs based on the information obtained from the control device of the moving object. The second electronic device 420 may detect an abnormality of the vehicle based on the obtained information from the control device of the moving object, and identify the abnormality of the vehicle as an emergency situation when the abnormality of the vehicle is urgent (e.g., braking of the vehicle is out of control or abnormal acceleration of the vehicle, etc.). As another example, the control device of the moving object may determine that it is an emergency situation and transmit a signal related to the emergency situation to the second electronic device 420.

As another example, the second electronic device 420 may include a plurality of sensors such as an acceleration sensor, a gyro sensor, and a proximity sensor. As another example, the sensors may be sensors mounted on a moving object, and the second electronic device 420 may receive data obtained by the sensors from the moving object.

The second electronic device 420 may detect whether a contact between the moving object on which the second electronic device 420 is mounted or mounted and the moving object adjacent to the second electronic device 420 occurs from the proximity sensor and the impact detection sensor. The second electronic device 420 may detect the posture, moving speed, and speed change of the moving object on which the second electronic device 420 is mounted from the acceleration sensor and the gyro sensor. When the posture change, movement speed, and speed change of the moving object are abnormal, the second electronic device 420 may detect that it is an emergency.

As another example, various methods described above may be used to detect the emergency situation.

According to an embodiment, in operation 526, the second electronic device 420 stop transmitting a signal to the first electronic device 410 in response to detection of an emergency situation. Since the power supplied to the second electronic device 420 may be limited, the second electronic device 420 may stop transmitting signals to the first electronic device 410 located at a long distance.

In operation 528, the second electronic device 420 may transmit a message indicating an emergency (or a signal indicating, an emergency) to an adjacent electronic device. The second electronic device 420 may open a communication channel (e.g., the third communication channel 445 of FIG. 4) with the third electronic device 430, and the second electronic device 420 may transmit data to the third electronic device 430. The second electronic device 420 may identify an electronic device existing at an adjacent location based on a list including information on adjacent terminals received from the first electronic device 410. For example, when the electronic device adjacent to the second electronic device 420 is the third electronic device 430, the third electronic device 430 may notify an emergency situation of a moving object on which the second electronic device 420 is equipped or mounted. For example, since the distance between the second electronic device 420 and the third electronic device 430 is shorter than the distance between the first electronic device 410 and the second electronic device 420, the transmission power required to transmit the message to the third electronic device 430 may be less than the transmission power required to transmit the message to the first electronic device 410. For example, the second electronic device 420 may transmit the message to the third electronic device 430 with transmission power lower than transmission power used when transmitting a message or signal to the first electronic device 410.

According to various embodiments, it has been described that the second electronic device 420 transmits a message indicating an emergency situation to the third electronic device 430, which is an electronic device adjacent to the second electronic device 420, but is not limited thereto; and the second electronic device 420 may transmit a message indicating an emergency situation to other adjacent electronic devices other than the third electronic device 430, and it is also possible to directly transmit the message to the first electronic device 410. When the second electronic device 420 fails to transmit a message indicating an emergency to the first electronic device 410 and the third electronic device 430 and retransmits, the second electronic device 420 may change the retransmission period to the first electronic device 410 and the third electronic device 430. The period in which the second electronic device 420 retransmits the message to the first electronic device 410 may be longer than the period in which the second electronic device 420 retransmits the message to the adjacent third electronic device 430. However, it is not limited thereto.

According to various embodiments, in operation 530, the third electronic device 430 may transmit a message indicating that a moving object mounted with the second electronic device 420 is in an emergency to the first electronic device 410 in response to the received emergency situation.

According to various embodiments, the third electronic device 430 may identify that the vehicle on which the second electronic device 420 is mounted is in an emergency situation based on receiving the message received from the second electronic device 420. Based on identifying that the second electronic device 420 is in an emergency situation, the third electronic device 430 may transmit a message indicating that the second electronic device 420 is in an emergency situation to the first electronic device 410.

The first electronic device 410 may transmit the received message to the emergency situation agency in response to reception of a message indicating that the second electronic device 420 is in an emergency situation.

As described above, the second electronic device 420 according to various embodiments may save communication resources of the second electronic device 420 consumed to inform the emergency situation of the vehicle, by transmitting a message indicating the emergency situation of the vehicle using a D2D link between the second electronic device 420 and the third electronic device 430 in response to detecting the emergency situation of the vehicle. This may be because resources consumed to use the D2D link between the second electronic device 420 and the third electronic device 430 are smaller than resources consumed to use the communication link between the first electronic device 410 and the second electronic device 420, since the distance between the second electronic device 420 and the third electronic device 430 is closer than the distance between the first electronic device 410 and the second electronic device 420. Meanwhile, the third electronic device 430 may notify the first electronic device 410 of the emergency situation of the vehicle based on the message received from the second electronic device 420.

FIG. 5 illustrates an example of stopping transmission of a signal to the first electronic device 410, but this is for convenience of explanation. Unlike FIG. 5, the second electronic device 420 may not execute the transmission of the signal. In this case, the second electronic device 420 according to various embodiments may provide transmission diversity by transmitting a message indicating the emergency situation of the vehicle to the first electronic device 410 and transmitting a message indicating the emergency situation of the vehicle to the third electronic device 430. Since the transmission diversity may robustly notify the first electronic device 410 of the emergency situation of the vehicle, it may provide an enhanced public safety service.

As described above, the electronic device (e.g., the electronic device 300) according to various embodiments may comprise a communication circuitry (e.g., communication circuit 330); a memory (e.g., memory 320) configured to store instructions; and a processor (e.g., processor 310), operably coupled with the communication circuitry; wherein the processor may be, when executing the instructions, configured to: receive, from a second electronic device operating as a relay node, a signal for indicating to transmit a test signal via a device-to-device (D2D) communication path between the first electronic device and a third electronic device to the third electronic device, the signal is transmitted from the second electronic device to the first electronic device in response to the second electronic device detecting that a communication path between the second electronic device and the third electronic device is disconnected; in response to the reception of the signal, transmit the test signal via the D2D communication path to the third electronic device; in response to the reception of the signal, activate a timer for monitoring whether a response signal regarding the test signal is received or not; based on identifying that the response signal is received from the third electronic device before the activated timer is expired, transmit, to the second electronic device, a first message for indicating that a vehicle comprising the third electronic device is not in an emergency situation; and based on identifying that the response signal is not received from the third electronic device until the activated timer is expired, transmit, to the second electronic device, a second message for indicating that the vehicle comprising the third electronic device is in the emergency situation.

In one configuration, the processor may be configured to repeatedly transmit the test signal to the third electronic device when executing the instructions. In one configuration, the processor may be configured to repeatedly transmit the test signal by transmitting to the third electronic device the test signal with a first transmit power and transmitting to the third electronic device the test signal with a second transmit power different from the first transmit power after transmitting the test signal with the first transmit power when executing the instructions. In one configuration, the processor may be configured to repeatedly transmit the test signal by transmitting to the third electronic device the test signal on a first frequency and transmitting to the third electronic device the test signal on a second frequency different from the first frequency after transmitting the test signal on the first frequency when executing the instructions.

In one embodiment, the timer may be activated in response to the last transmission of the test signal.

In one embodiment, the test signal may be unicast.

In one configuration, the signal may be configured to identify from among a plurality of signals that are transmitted from the second electronic device to the first electronic device and when executing the instructions, the processor may be configured to receive, from the second electronic device, remaining signals except the signal from among the plurality of signals, after receiving the signal from among the plurality of signals from the second electronic device.

In an embodiment, the first electronic device may be identified from among a plurality of electronic devices in at least one cell provided by the second electronic device, based on the location information obtained by the second electronic device.

In an embodiment, the first electronic device may have identification information corresponding to identification information of the third electronic device.

In an embodiment, disconnection of a communication path between the second electronic device and the third electronic device may be detected by the second electronic device, based on identifying not to receive a signal from the third electronic device in a state in which a quality of a state of the communication path between the second electronic device and the third electronic device that is estimated by the second electronic device is above a reference quality.

As described above, according to various embodiments, a method for operating a first electronic device comprising a communication circuitry, the method may comprise: receiving, from a second electronic device operating as a relay node, a signal for indicating to transmit a test signal via a device-to-device (D2D) communication path between the first electronic device and a third electronic device to the third electronic device, the signal is transmitted from the second electronic device to the first electronic device in response to the second electronic device detecting that a communication path between the second electronic device and the third electronic device is disconnected; in response to the reception of the signal, transmit the test signal via the D2D communication path to the third electronic device; in response to the reception of the signal, activate a timer for monitoring whether a response signal regarding the test signal is received or not; based on identifying that the response signal is received from the third electronic device before the activated timer is expired, transmit, to the second electronic device, a first message for indicating that a vehicle comprising the third electronic device is not in an emergency situation; and based on identifying that the response signal is not received from the third electronic device until the activated timer is expired, transmit, to the second electronic device, a second message for indicating that the vehicle comprising the third electronic device is in the emergency situation.

As described above, according to various embodiments, a computer readable storage medium may store one or more programs, the one or more programs comprising instructions which, when executed by at least one processor of a first electronic device, cause the first electronic device to: receive, from a second electronic device operating as a relay node, a signal for indicating to transmit a test signal via a device-to-device (D2D) communication path between the first electronic device and a third electronic device to the third electronic device, the signal is transmitted from the second electronic device to the first electronic device in response to the second electronic device detecting that a communication path between the second electronic device and the third electronic device is disconnected; in response to the reception of the signal, transmit the test signal via the D2D communication path to the third electronic device; in response to the reception of the signal, activate a timer for monitoring whether a response signal regarding the test signal is received or not; based on identifying that the response signal is received from the third electronic device before the activated timer is expired, transmit, to the second electronic device, a first message for indicating that a vehicle comprising the third electronic device is not in an emergency situation; and based on identifying that the response signal is not received from the third electronic device until the activated timer is expired, transmit, to the second electronic device, a second message for indicating that the vehicle comprising the third electronic device is in the emergency situation.

Methods according to the embodiments described in the claims or specifications of the present disclosure may be implemented in the form of hardware, software, or a combination of hardware and software.

When implemented as software, a computer-readable storage medium may be provided that stores one or more programs (software modules). One or more programs stored in the computer-readable storage medium are configured for execution by one or more processors in an electronic device.

One or more programs include instructions that cause the electronic device to execute the methods according to the embodiments described in the claims or specification of the present disclosure.

These programs (software modules, software) may be stored in random access memory, non-volatile memory including flash memory, ROM (Read Only Memory), and electrically erasable Read Only Memory (EEPROM), magnetic disk storage device, Compact Disc-ROM (CD-ROM), Digital Versatile Disks (DVDs), or other forms of optical storage, magnetic cassette. Alternatively, it may be stored in a memory composed of a combination of some or all of them. In addition, each configuration memory may be included in plurality.

In addition, the program may be stored in a communication network such as the Internet, an intranet, a local area network (LAN), a wide LAN (WLAN), or a storage area network (SAN); or an attachable storage device that can be accessed through a communication network composed of a combination thereof. Such a storage device may access a device performing an embodiment of the present disclosure through an external port. In addition, a separate storage device on the communication network may access a device performing an embodiment of the present disclosure.

In specific embodiments of the present disclosure described above, the components included in the disclosure have been expressed in a single or plural number according to the specific embodiments presented. However, singular or plural expressions are selected appropriately for the situation presented for convenience of explanation, and the present disclosure is not limited to singular or plural components and even if it is a component expressed in plural, it may consist of a single number, or even if it is a component expressed in a single number, it may consist of a plurality.

Meanwhile, detailed embodiments have been described in the detailed description of the present disclosure, but it goes without saying that various modifications are possible within the limit not departing from the scope of the present disclosure. Therefore, the scope of the present disclosure should not be limited to the described embodiments, but should be determined by the scope of the patent claim to be described later as well as those equivalent to the scope of the patent claim.

The invention claimed is:

1. A first electronic device comprising:
   a communication circuitry;
   a memory configured to store instructions; and
   a processor, operably coupled with the communication circuitry,
   wherein the processor is, when executing the instructions, configured to:
   receive, from a second electronic device operating as a relay node, a signal for indicating to transmit a test signal via a device-to-device (D2D) communication path between the first electronic device and a third electronic device to the third electronic device, the signal is transmitted from the second electronic device to the first electronic device in response to the second electronic device detecting that a communication path between the second electronic device and the third electronic device is disconnected;
   in response to the reception of the signal, transmit the test signal via the D2D communication path to the third electronic device;
   in response to the reception of the signal, activate a timer for monitoring whether a response signal regarding the test signal is received or not;
   based on identifying that the response signal is received from the third electronic device before the activated timer is expired, transmit, to the second electronic device, a first message for indicating that a vehicle comprising the third electronic device is not in an emergency situation; and
   based on identifying that the response signal is not received from the third electronic device until the activated timer is expired transmit, to the second electronic device, a second message for indicating that the vehicle comprising the third electronic device is in the emergency situation.

2. The first electronic device of claim 1, wherein the processor is, when executing the instructions, configured to:
   repeatedly transmit the test signal to the third electronic device.

3. The first electronic device of claim 2, wherein the processor is, when executing the instructions, configured to:
   repeatedly transmit the test signal by transmitting to the third electronic device the test signal with a first transmit (Tx) power and transmitting to the third electronic device the test signal with a second Tx power different from the first Tx power after transmitting the test signal with the first transmit power.

4. The first electronic device of claim 2, wherein the processor is, when executing the instructions, configured to:
   repeatedly transmit the test signal by transmitting to the third electronic device the test signal on a first frequency and transmitting to the third electronic device the test signal on a second frequency different from the first frequency after transmitting the test signal on the first frequency.

5. The first electronic device of claim 2, wherein the timer is activated in response to the last transmission of the test signal.

6. The first electronic device of claim 1, wherein the test signal is unicasted.

7. The first electronic device of claim 1, wherein the signal is identified from among a plurality of signals that are transmitted from the second electronic device to the first electronic device, and
   wherein the processor is when executing the instructions, configured to:
   receive, from the second electronic device, remaining signals except the signal from among the plurality of signals, after receiving the signal from among the plurality of signals from the second electronic device.

8. The first electronic device of claim 1, wherein the first electronic device is identified from among a plurality of electronic devices in at least one cell provided by the second electronic device, based on location information obtained by the second electronic device.

9. The first electronic device of claim 1, wherein the first electronic device has identification information cones ponding to identification information of the third electronic device.

10. The first electronic device of claim 1, wherein a disconnection between the second electronic device and the third electronic device is detected by the second electronic device, based on identifying not to receive a signal from the third electronic device in a state in which a quality of a state of the communication path between the second electronic device and the third electronic device that is estimated by the second electronic device is above a reference quality.

11. A method for operating a first electronic device comprising a communication circuitry, the method comprising:
    receiving, from a second electronic device operating as a relay node, a signal for indicating to transmit a test signal via a device-to-device (D2D) communication path between the first electronic device and a third electronic device to the third electronic device, the signal is transmitted from the second electronic device to the first electronic device in response to they second electronic device detecting that a communication path between the second electronic device and the third electronic device is disconnected;
in response to the reception of the signal transmitting the test signal via the D2D communication path to the third electronic device;
in response to the reception of the signal, activating a timer for monitoring whether a response signal regarding the test signal is received or not;
based on identifying that the response signal is received from the third electronic device before the activated timer is expired, transmitting, to the second electronic device, a first message for indicating that a vehicle comprising the third electronic device is not in an emergency situation; and
based on identifying that the response signal is not received from the third electronic device until the activated timer is expired, transmitting, to the second electronic device, a second message for indicating that the vehicle comprising the third electronic device is in the emergency situation.

12. The method of claim 11, wherein transmitting the test signal comprises:
repeatedly transmitting the test signal to the third electronic device.

13. The method of claim 12, wherein repeatedly transmitting the test signal comprises:
repeatedly transmitting the test signal by transmitting to the third electronic device the test signal with a first transmit (Tx) power and transmitting to the third electronic device the test signal with a second Tx power different from the first Tx power after transmitting the test signal with the first transmit power.

14. The method of claim 12, wherein repeatedly transmitting the test signal comprises:
repeatedly transmitting the test signal by transmitting to the third electronic device the test signal on a first frequency and transmitting to the third electronic device the test signal on a second frequency different from the first frequency after transmitting the test signal on the first frequency.

15. The method of claim 12, wherein the timer is activated in response to the last transmission of the test signal.

16. The method of claim 11, wherein the signal is identified from among a plurality of signals that are transmitted from the second electronic device to the first electronic device, and wherein the method further comprises:
receiving, from the second electronic device, remaining signals except the signal from among the plurality of signals, after receiving the signal from among the plurality of signals from the second electronic device.

17. The method of claim 11, wherein the first electronic device is identified from among a plurality of electronic devices in at least one cell provided by the second electronic device, based on location information obtained by the second electronic device.

18. The method of claim 11, wherein the first electronic device has identification information corresponding to identification information of the third electronic device.

19. The method of claim 11, wherein a disconnection between the second electronic device and the third electronic device is detected by the second electronic device, based on identifying not to receive a signal from the third electronic device in a state in which a quality of a state of the communication path between the second electronic device and the third electronic device that is estimated by the second electronic device is above a reference quality.

20. A non-transitory computer readable storage medium storing one or more programs, the one or more programs comprising instructions which, when executed by at least one processor of a first electronic device, cause the first electronic device to:
receive, from a second electronic device operating as a relay node, a signal for indicating to transmit a test signal via a device-to-device (D2D) communication path between the first electronic device and a third electronic device to the third electronic device, the signal is transmitted from the second electronic device to the first electronic device in response to the second electronic device detecting that a communication path between the second electronic device and the third electronic device is disconnected;
in response to the reception of the signal, transmit the test signal via the D2D communication path to the third electronic device;
in response to the reception of the signal, activate a timer for monitoring whether a response signal regarding the test signal is received or not;
based on identifying that the response signal is received from the third electronic device before the activated timer is expired, transmit, to the second electronic device, a first message for indicating that a vehicle comprising the third electronic device is not in an emergency situation, and
based on identifying that the response signal is not received from the third electronic device until the activated timer is expired transmit, to the second electronic device, a second message for indicating that the vehicle comprising the third electronic device is in the emergency situation.

* * * * *